United States Patent [19]
Freitag

[11] 3,762,514
[45] Oct. 2, 1973

[54] SUPPORT COLUMN OF ADJUSTABLE LENGTH

[75] Inventor: Herbert Freitag, Koblenz-Lutzel, Germany

[73] Assignee: Stabilus Industrie- und Handelsgesellschaft mbH, Koblenz-Neuendorf, Germany

[22] Filed: May 17, 1971

[21] Appl. No.: 143,928

[30] Foreign Application Priority Data
May 21, 1970 Germany.................. P 20 24 749.8

[52] U.S. Cl.................. 188/300, 188/280, 188/314, 248/354 H, 297/216
[51] Int. Cl.......................................... F16d 63/00
[58] Field of Search.................. 188/280, 300, 314, 188/322, 319; 248/354 H, 393, 400; 297/355, 216, 386

[56] References Cited
UNITED STATES PATENTS

| | | | |
|---|---|---|---|
| 2,808,904 | 10/1957 | O'Connor et al. | 188/314 |
| 3,180,453 | 4/1965 | Murata | 188/280 |
| 2,453,855 | 11/1948 | Oliver | 188/300 |
| 3,388,883 | 6/1968 | Axthammer et al. | 248/354 H X |

FOREIGN PATENTS OR APPLICATIONS

| | | | |
|---|---|---|---|
| 520,317 | 3/1955 | Italy | 188/319 |

Primary Examiner—George E. A. Halvosa
Attorney—Kelman & Berman

[57] ABSTRACT

In a column of adjustable length having a cylinder, a piston assembly movable in the cylinder cavity and partly projecting from the same in an axial direction, a first or primary valve operable from outside the cylinder cavity which is divided by the piston assembly into two compartments, and a liquid filling the cylinder cavity except for a cushion of compressed gas, the movement of the piston assembly against the restraint of the gas cushion is blocked by a second, automatic valve in a fixed partitition wall between the piston and the gas cushion in response to sudden movement of the piston assembly inward of the cylinder.

11 Claims, 1 Drawing Figure

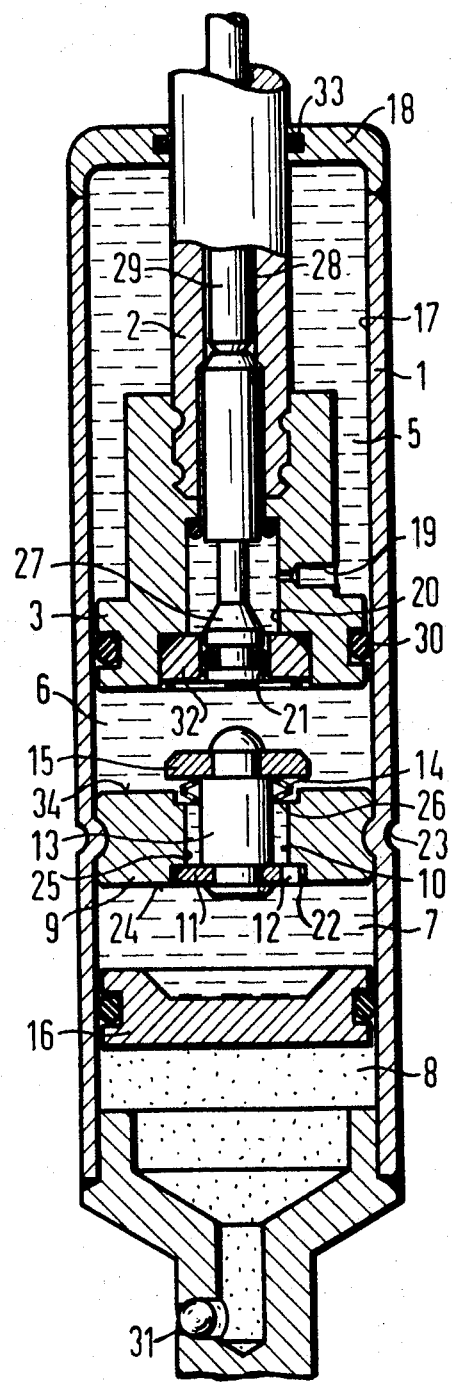

SUPPORT COLUMN OF ADJUSTABLE LENGTH

This invention relates to a column of adjustable length, and particularly to improvements in a column of the type in which a piston is received in a liquid-filled cylinder, the liquid being exposed to the pressure of a body of gas, and movement of the piston may be impeded by a manually operated valve in a by-pass connecting the compartments in the cylinder cavity on either side of the piston.

Columns of the general type described have been found useful as adjustable supports for a passenger seat in an automotive vehicle. The position of the seat may be adjusted while the valve is open, and the column provides a resilient support for the seat when the valve is closed. The column yields under the normal inertial forces exerted by the body of the passenger to a small extent which makes the seat very comfortable.

The resiliency of the column, however, has been found to be potentially dangerous in a collision in which greater than normal inertial forces may be exerted on the seat and cause an uncontrolled movement of the passenger with the seat. It is a primary object of the invention to provide an adjustable column which responds resiliently to normal changed in an applied load, but loses its resiliency when exposed to a dynamic load greater than the normal load for which the column is designed.

With this object and others in view, the invention provides a column of the type described with a wall member dividing the liquid-filled portion of the cylinder compartment which also holds the cushion of compressed gas. A throttling passage of reduced cross section connects two parts of the liquid-filled portion. A valve which moves toward and away from a position in which it closes the throttling passage is operated automatically in response to a predetermined difference between the liquid pressures in the two parts so as to be moved toward the closing position by a high pressure difference.

Other features, additional objects, and many of the attendant advantages of this invention will readily be appreciated as the same becomes better understood from the following detailed description of a preferred embodiment when considered in connection with the appended drawing whose sole FIGURE illustrates a support column of the invention in elevational section on the axis of its cylinder.

Referring to the Drawing in detail, there is shown a column of adjustable length or height having a cylinder 1 and a piston assembly essentially consiting of a piston rod 2 and a piston 3 provided with a resilient sealing ring 30. When the piston 3 moves axially in the cylinder 1, the fixedly attached piston rod 2 moves inward and outward of the cylinder cavity through an annular, radial end wall 18 of the cylinder to which the piston rod 2 is sealed by a gasket 33. The piston 3 axially divides the cylinder cavity into two compartments, the tubular piston rod 2 passing through one compartment 5.

The other compartment is axially divided into three parts 6, 7, 8 by an axially fixed partition wall 9 between the parts 6 and 7, and by a floating piston 16 forming a movable partition between the parts 7 and 8 and sealingly engaging the inner axial face 17 of the cylinder 1.

A passage connects the parts 6 and 7. It is defined partly in an axial bore 25 of the wall 9 by a pin 13 received in the bore 25 with an annular clearance gap 10, and includes a throttling opening 12 in a washer 11 fixedly fastened on one end of the pin 13 and received in an enlarged orifice 22 of the bore 25 in the radial face 24 of the wall 9 which is remote from and directed axially away from the piston 3. The opening 12 connects the gap 10 with the part 7 of the cylinder cavity.

The end of the pin 13 near the piston 3 fixedly carries a valve plate 15 which is biased away from the associated enlarged orifice 26 of the bore 25 by a stack of perforated cup springs 14 which do not interfere with liquid flow between the cavity part 6 and the gap 10 in the illustrated open position of the valve plate 15.

The piston assembly is tubular. An axial bore 28 mainly extending in the piston rod 2 sealingly receives a valve operating rod 29. The outer end of the operating rod 29 is accessible from outside the cylinder cavity so that the rod 29 may be axially moved by hand in the bore 28. Abutting shoulders of the operating rod 29 and of the piston rod 2 prevent the operating rod 29 from moving outward of the piston rod beyond the illustrated position.

The inner end of the rod 29 extends into an axial bore 20 of the piston 3 and carries a valve member 27 which is provided with an O-ring 21 in sealing engagement with a ring 32 on the piston 3 in the illustrated position of the valve member 27. The axial bore 20 permanently communicates with the compartment 5 though a stepped radial bore 19 in the piston 3.

The compartment 5 and the parts 6, 7 of the other compartment between the tubular piston 3 and the floating piston 16 are filled with liquid, such as hydraulic fluid, and liquid flow between the compartments is prevented by the closed position of the primary valve member 27. The piston rod 2 cannot move outward of the cylinder cavity against the resistance of the noncompressible liquid in the compartment 5. Inward movement is not significantly impeded by the formation of a partial vacuum in the compartment 5, but is resiliently opposed by the pressure of the gas cushion, typically a hundred pounds per square inch or more, in the cavity part 8. Under all normal operating stresses, the axial stroke of the piston 3 is very short.

When the valve member 27 is moved downwardly by manually shifting the operating rod 29, the conduit formed by the bores 19, 20 is opened, and liquid may flow between the compartment 5 and the liquid-filled part 7 of the other compartment. Unless an adequate load is applied to the piston rod 2, the piston rod is expelled from the cylinder 1 by the pressure of the gas in the cavity part 8. If a sufficient load is applied to the piston rod 2, the piston assembly is pushed inward of the cylinder 1, and the length or height of the column may thus be adjusted.

If a very high load is applied to the column suddenly while the conduit 19, 20 is closed by the valve member 27, the resistance of the gas cushion may be overcome sufficiently to permit a relatively long inward movement of the piston rod 2 followed by a sharp rebound as the gas cushion again expands when the load is removed. Such an excessive stroke of the piston 3 is prevented by the secondary, automatic valve. The valve plate 15 is moved from the illustrated open position against the biasing force of the cup springs 14 by the washer 11 when the difference of the pressures applied to opposite radial faces of the washer, that is, the liquid pressures in the cavity parts 6 and 7, becomes sufficiently great to overcome the restraint of the cup springs 14. The pressure differential necessary to move the washer 11 from the illustrated position axially out of the orifice 22 is determined by the characteristics of the cup springs 14 which may be chosen for any desired pressure differential. The pressure differential is a function of the inward velocity of the piston 3 and of the restricted flow section of the throttling opening 12. The size of the opening may be chosen for any desired limiting piston velocity.

When that piston velocity is reached, as during a collision in the afore-described application of the illustrated support column, the washer 11 is moved downward by the liquid, and the valve-operating movement of the washer is transmitted to the valve plate 15 by the pin 13 so that the valve plate 15 abuttingly engages the face 34 of the wall 9 which is directed toward the piston 3. The piston 3 is stopped thereby after an inward movement whose length is determined by the piston velocity. The clearance gap 10 is opened again when the load on the piston rod 2 is reduced, and the piston 3 is returned to its normal position by the expanding gas cushion in the cavity part 8.

While the support column has been described with reference to a car seat, and has found an important field of application in such a seat, it may be used elsewhere.

It should also be understood that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. A column of adjustable length comprising, in combination:
   a. a cylinder member having an axis and enclosing a cavity;
   b. a piston member movable axially in said cavity and dividing the same into two compartments;
   c. a piston rod member fixedly fastened to said piston member and extending from the same axially outward of said cavity;
   d. first valve means operably interposed between said compartments;
   e. first valve operating means accessible from outside said cavity for moving said valve means toward and away from a position in which said valve means seals said compartments from each other;
   f. a body of liquid filling one of said compartments and a portion of the other compartment in all operative positions of said piston member;
   g. a body of gas under a pressure higher than atmospheric pressure filling the remainder of said other compartment;
   h. a wall member in said portion of said other compartment and dividing the same into one part adjacent said piston member and remote from said body of gas, and another part adjacent said body of gas and remote from said piston member;
   i. means defining a passage connecting said parts;
   j. second valve means movable toward and away from a position in which said second valve means prevents liquid flow through said passage;
   k. second valve operating means responsive to an increase in liquid pressure in said one part for moving said second valve means into said position thereof; and
   l. biasing means biasing said second valve means away from said position thereof with a force sufficient to maintain liquid flow through said passage until said pressure in said one part exceeds a predetermined value.

2. A column of adjustable length comprising, in combination:
   a. a cylinder member having an axis and enclosing a cavity;
   b. a piston member movable axially in said cavity and dividing the same into two compartments;
   c. a piston rod member fixedly fastened to said piston member and extending from the same axially outward of said cavity;
   d. first valve means operably interposed between said compartments;
   e. first valve operating means accessible from outside said cavity for moving said valve means toward and away from a position in which said valve means seals said compartments from each other;
   f. a body of liquid filling one of said compartments and a portion of the other compartment in all operative positions of said piston member;
   g. a body of gas under a pressure higher than atmospheric pressure filling the remainder of said other compartment;
   h. a wall member in said portion of said other compartment and dividing the same into one part adjacent said piston member and remote from said body of gas, and another part adjacent said body of gas and remote from said piston member;
   i. means defining a passage connecting said parts;
   j. second valve means movable toward and away from a position in which said second valve means prevents liquid flow through said passage;
   k. second valve operating means responsive to liquid flow from said one part to said other part for moving said second valve means into said position thereof; and
   l. yieldably resilient means biasing said second valve means away from said position thereof with a force sufficient to maintain liquid flow through said passage until said flow exceeds a predetermined rate.

3. A column as set forth in claim 2, further comprising fastening means fastening said wall member to said cylinder in sealing engagment in a fixed axial position.

4. A column as set forth in claim 2, said yieldably resilient means including spring means having two spaced portions respectively engaging said wall members and said second valve means.

5. A column as set forth in claim 2, said yieldably resilient means including a cup spring.

6. A column as set forth in claim 2, further comprising a partition member axially movable in said cavity in sealing engagement with said cylinder member and separating said bodies.

7. A column as set forth in claim 2, said piston member and said piston rod member jointly constituting a piston assembly, said assembly being formed with a conduit (19, 20, 21) connecting said two compartments, said first valve means including a valve member movable relative to said conduit in an axial direction between a conduit-opening position and a conduit-closing position, and said first valve operating means including an operating member received in said piston rod member for axial movement and fixedly secured to said valve member.

8. A column as set forth in claim 2, the pressure of said body of gas being sufficient to drive said piston rod member outward of said cavity when said first and second valve means are open.

9. A column as set forth in claim 2, said second valve operating means including an operating member having two opposite faces respectively exposed to said liquid in said two parts when said second valve means is away from said position thereof, and a motion transmitting member connecting said operating member to said second valve means for joint movement.

10. A column as set forth in claim 9, said wall member being formed with a bore constituting said passage, said bore having two orifices communicating with said two parts respectively, said motion transmitting member being received in said bore with a clearance sufficient for flow of liquid between said two parts, said second valve means and said operating member being located adjacent said orifices respectively.

11. A column as set forth in claim 10, said clearance constituting an annular gap about said motion transmitting member, said operating member being formed with a throttling opening therethrough communicating with said gap and with one of said two parts and constituting said passage, said second valve means when in said position thereof closing said gap.

* * * * *